United States Patent
Schuurmans

(10) Patent No.: US 6,338,914 B1
(45) Date of Patent: Jan. 15, 2002

(54) HOUSING WITH A BATTERY COMPARTMENT

(75) Inventor: Johann Herman Schuurmans, Aalden (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/457,868

(22) Filed: Dec. 10, 1999

Related U.S. Application Data

(63) Continuation of application No. PCT/NL98/00322, filed on Jun. 3, 1998.

(30) Foreign Application Priority Data

Jun. 13, 1997 (NL) .............................................. 1006316

(51) Int. Cl.⁷ ................................................. H01M 2/10
(52) U.S. Cl. ............................ 429/97; 429/96; 429/99; 429/100
(58) Field of Search ................................ 429/176, 177, 429/96–100

(56) References Cited

U.S. PATENT DOCUMENTS 3,743,915 A   7/1973  Struck
3,979,228 A   9/1976  Marchetti
5,567,545 A * 10/1996 Murakami .................. 429/163

FOREIGN PATENT DOCUMENTS

DE    1 752 462      9/1957
WO    WO 98/57383   12/1998

\* cited by examiner

Primary Examiner—Stephen Kalafut
Assistant Examiner—Mark Ruthkosky
(74) Attorney, Agent, or Firm—Burns, Doane, Swecker & Mathis, L.L.P.

(57) ABSTRACT

Housing for electronic means, comprising a compartment with an opening which is suitable for allowing through a battery, a cover which is suitable for closing off the opening, spring means which, when the cover has closed off the opening and when the battery is situated in the compartment, maintain the battery opposite the cover under spring force, and bearing means which have inwardly facing bearing surfaces for supporting from the inside an edge section of the cover. The cover and the remainder of the housing have dimensions which are such that, when the cover closes off the opening from the inside, the cover can be displaced further into the compartment and then with an indication through the opening, counter to the action of the spring means. Inside the housing there are arranged locking means opposite the cover (14), which locking means can be actuated from outside the housing so as to lock or unlock the cover when it has closed off the opening.

8 Claims, 3 Drawing Sheets

HOUSING WITH A BATTERY COMPARTMENT

CROSS-REFERENCE TO RELATED APPLICATIONS

This application claims priority under 35 U.S.C. §§119 and/or 365 to 1006316 filed in The Netherlands on Jun. 13, 1997; the entire content of which is hereby incorporated by reference.

This application is a continuation application of International Application No. PCT/NL98/00322, filed Jun. 3, 1998, which designates the United States.

FIELD OF THE INVENTION

The invention relates to a housing for electronic means, comprising a compartment with an opening which is arranged in a wall of the housing and which is suitable for allowing through a battery and placing it in the compartment, a cover, which is suitable for closing off the opening, spring means which are arranged inside the compartment and which are such as to develop a spring force, with the cover in its position closing the compartment opening, against the cover and the battery inside the compartment, and bearing means, which are arranged in the region of the opening and which have inwardly facing bearing surfaces which are suitable for bearing a section of the cover, and the cover and the remainder of the housing have dimensions which allow translation of the cover for displacing it from its closing position to a position in which it leaves the compartment opening open.

BACKGROUND OF THE INVENTION

A housing of the above type is disclosed by U.S. Pat. No. 3,979,228. The prior art housing has pivot means at one end of its battery compartment cover allowing the cover to translate and simultaneously tilt slightly from the closing position of the cover against a spring force for disengaging the cover from bearing means provided by inside parts of the housing. The pivot means comprise a pair of inclined cover slots and two pintles protruding from the inside walls of the housing into said slots. The spring force is provided by a leaf spring and acts against said end of the cover in the direction which is substantially parallel to a main plane of the cover. The bearing means comprise detent hooks of said cover and projections provided on the inside wall of the housing for engaging the hooks to inhibit displacement of the cover from its closing position with its hooks supported on said projections away from the battery compartment. To open the compartment the cover is first translated, and because of the inclination of the pivot slots slightly tilted, to disengage the hooks of the cover from the projections they are resting on. After disengagement of the hooks from the protections the cover can be rotated around the pivot means to the outside, thereby exposing the battery compartment. For closing the compartment similar displacements of the cover are made in reverse order.

With the prior art housing the cover is not secured against unwanted or accidental translation of the cover and then rotation from its closed position. Such unwanted or accidental displacements may occur by an impact on the housing, in particular on the cover, for example when the housing is dropped onto the ground. Since the battery can move after the battery compartment opening is cleared, an electrical connection between contact faces of the battery and contacts of the remaining electronic means will generally be broken, with the result that these electronic means will no longer receive power from the battery and will cease to function. In some situations, this may represent a drawback, for example if the device is an emergency pager, which has to be activated, possibly automatically because of a fall of the wearer, so as to generate an alarm signal and/or transmit an emergency call. Furthermore, sparks may be produced when the said electrical connection is broken. In some situations, this can cause an explosion and/or fire.

SUMMARY OF THE INVENTION

The object of the invention is to eliminate the drawbacks of the known housing.

This object is achieved for the housing of the type described in the introduction by that the spring means are arranged to urge the cover outwardly, a room between the cover and the battery placed in the compartment being sufficient to allow displacement of the cover, in sequence and vice versa, from its closing position moving inwardly against the spring force, tilting and inward translation, further tilting and outward translation of the cover, inside the housing, and opposite the cover, there are arranged blocking means which are operable from the outside to move a blocking part of the blocking means to or from the cover being in its C losing position to not allow and to allow respectively the removal of the cove r from the housing. As a result, the cover can only be removed if the locking means are expressly moved into a suitable position by a user from the outside. The result is a very safe embodiment which is emanently suitable for use in areas where there is a risk of explosion.

BRIEF DESCRIPTION OF THE DRAWINGS

The invention is explained below on the basis of a preferred embodiment with reference to the appended drawings, in which:

FIG. 4 shows a cross-section similar to that of FIG. 31 where the cover has been pressed in;

DESCRIPTION OF THE PREFERRED EMBODIMENTS

Figure 1:
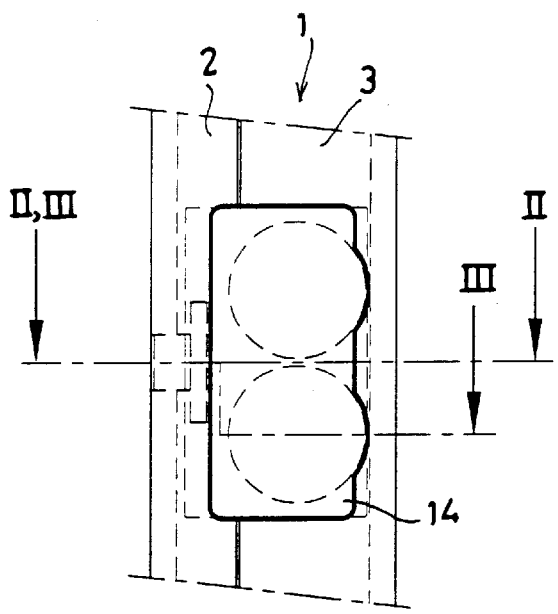
FIG. 1 shows a section of a housing, in particular a view of a cover opposite an opening of a battery compartment.
Figure 2:
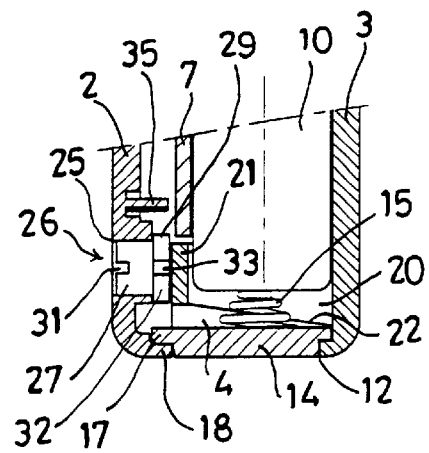
FIG. 2 shows a cross-section along line II—II of FIG. 1, over a limited height of the compartment and in a position in which the cover has closed off an opening of the compartment.
Figure 3:
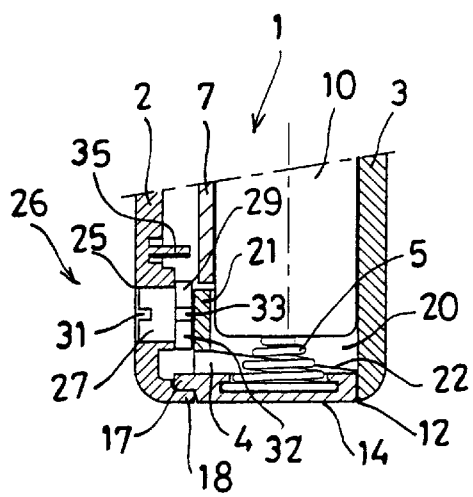
FIG. 3 shows a cross-section along line III—III of FIG. 1, over a limited height of the compartment and in a position in which the cover has closed off an opening of the compartment.

The housing 1, part of which is shown in FIG. 1, for electronic means comprises a first shell part 2 and a second shell part 3, which are attached to one another in a manner which is not shown. As shown in FIGS. 2, 3, the housing 1 contains a chamber 4, which can be delimited by a component 7 which is present inside the first shell part 2, such as a printed circuit board (pcb), and the second shell part 3. The chamber 4 forms a compartment for holding a battery 10. Opposite one end of the battery 10, the shell parts 2 and 3 delimit an opening 12 of the compartment 4 which is suitable for allowing through the battery 10. In the situation shown in FIG. 2, the opening 12 is closed off by means of a cover 14. On the inside, the cover 14 has a compression spring 15, which, in the situation shown in FIG. 2, is compressed slightly and is supported against the end of the battery 10. Edge sections of the cover 14 and mutually opposite sections of the shell parts 2, 3 have a shape and dimensions which are such that the cover 14, in the situation shown in FIGS. 2, 3, cannot be displaced laterally, i.e. parallel to a main plane of the cover 14. In the embodiment shown, this is achieved by the fact that a central section of the cover 14 fits inside the opening 12 and a section 17 which is situated further towards the inside of the chamber 4 overlaps edge sections, such as edge section 18, of the shell parts 2, 3 and fits laterally between the shell parts 2, 3.

Inside the housing 1, the second shell part 3 has an auxiliary piece 20 which projects towards the first shell part 2 and has an end section 21 which is parallel to an opposite main plane of shell part 2 and is situated at a sufficient distance from a main plane of the shell part 3 for the battery 10 to be able to pass between the main plane of the second shell part 3 and the end section 21. Opposite the cover 14, the auxiliary piece 20 has a stop edge 22, the distance of which from the inside of the cover 14 increases towards the end section 21, the smallest distance preferably being less than the thickness of the central section of the cover 14. In the embodiment shown, the said smallest distance is virtually zero.

Opposite the end section 21 of the auxiliary piece 20, the first shell part 2 has a round opening 25. Before the second shell part 3 is coupled to the first shell part 2 during production of the housing 1, a locking member 26 is inserted in the opening 25 from the inside of the first shell part 2. The locking member 26, which is shown in perspective in FIG. 9, comprises a pin piece 27, which projects into the opening 25, and a locking plate 28, which stands radially on the pin piece 27 and forms projections 29 at the ends. The locking plate 28 fits with a slight clearance between an edge section of the opening 25 of the first shell part 2 and the end section 21 of the auxiliary piece 20 of the second shell part 3. A radial slot 31 is formed in the end of the pin piece 27. This enables the locking member 26 to be rotated, by means of, for example, a screwdriver which is placed in the slot 31, between a position shown in FIGS. 2 to 7, 11, in which the locking member 28 is free of the cover 14, and a position shown in FIGS. 8, 10, in which a supporting surface 32 of a projection 29 of the locking plate 28 is supported against the cover 14. The supporting surfaces 32 each have an axial groove 33. Two flexible plate pieces 35 are formed on the inner wall of the first shell part 2, around the locking member 26 and respectively parallel and perpendicular to a plane through the opening 12 of the compartment 4. Opposite the locking member 26, the plate pieces 35 have a rib 36 which fits into the grooves 33 of the locking member 26. As a result, the locking member 26 can be held in the locked position shown in FIG. 10 or in the unlocked position.

Figure 8:
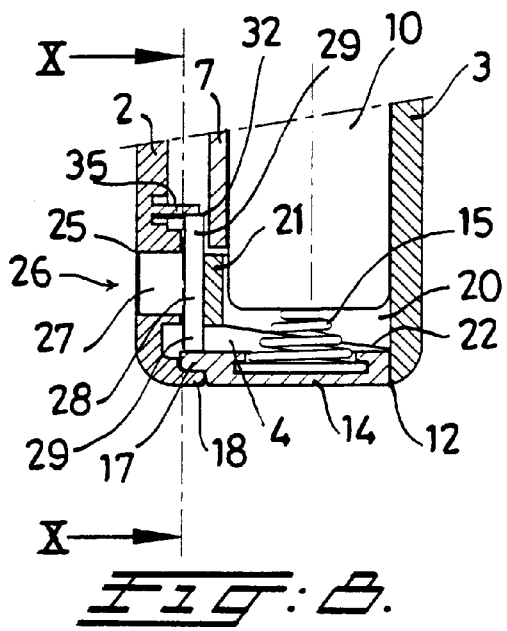
FIG. 8 shows a cross-section similar to that of FIG. 3, in which the position of the cover has been locked by locking means.
Figure 9:
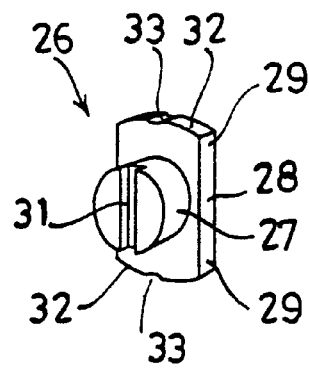
FIG. 9 shows a perspective view of a locking member of the locking means.
Figure 10:
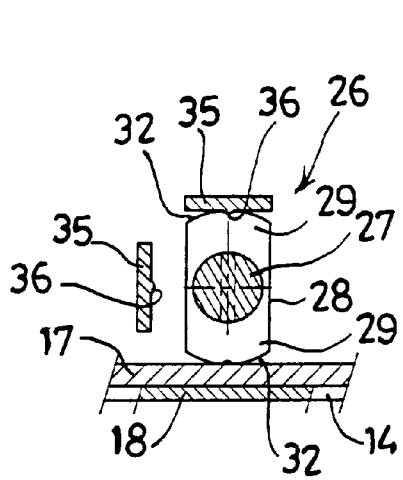
FIG. 10 shows a partial cross-section along line X—X of FIG. 8, with the locking member in the locked position.
Figure 11:
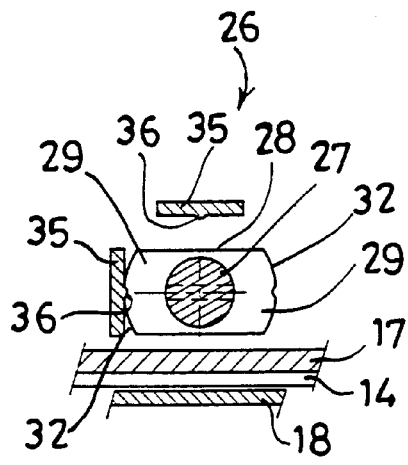
FIG. 11 shows a cross-section similar to that of FIG. 10, with the locking member in an unlocked position.

During use of the housing and the electronic means present therein, the battery 10 is situated in the compartment 4 and the locking member 26 is preferably situated in the locked position as shown in FIGS. 8 and 10. Due to the fact that in the locked position a supporting surface 32 of the locking plate 28 is supported against the inside of the cover 14, and due to the fact that the cover 14 is blocked in the region of the opposite side by the stop edge 22, the cover 14 cannot be pressed in, even if the cover 14 is subjected to an impact, such as when the housing 1 is dropped onto the ground.

Figure 4:
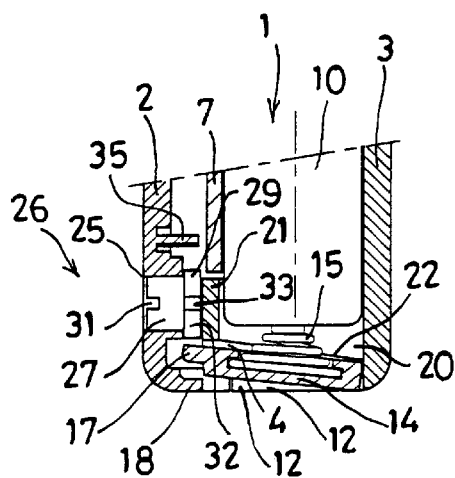
Figure 5:
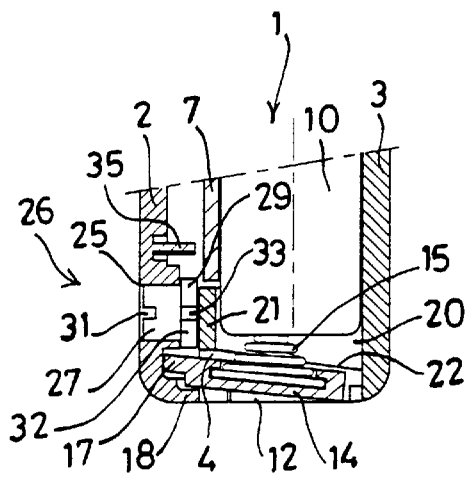
FIG. 5 shows a cross-section similar to that of FIG. 3, in which the cover has been pressed in and displaced laterally.
Figure 6:
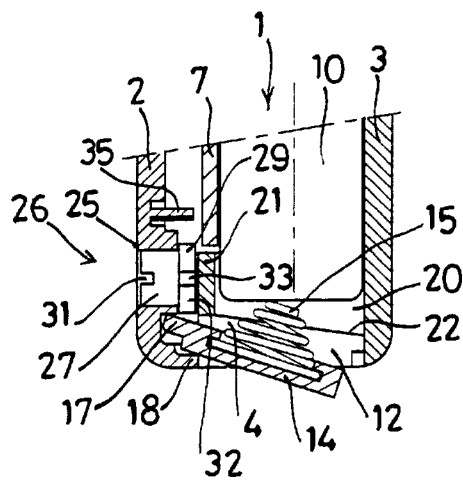
FIG. 6 shows a cross-section similar to that of FIG. 3, in which the cover has been displaced laterally and partially tilted out of the compartment.
Figure 7:
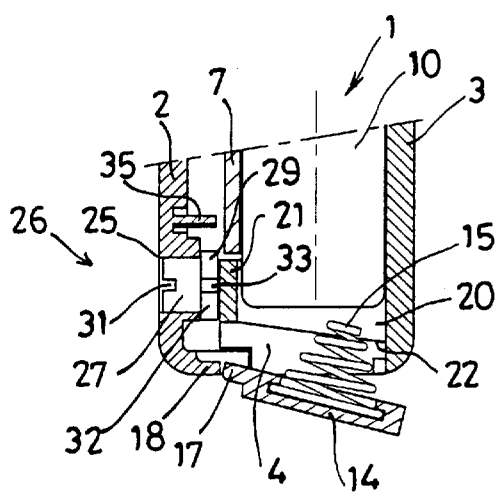
FIG. 7 shows a cross-section similar to that of FIG. 3, in which the cover is free of the compartment.

When the battery 10 has to be replaced, from the locked situation shown in FIG. 8, the locking member 26 first has to be rotated through 90°, so that the situation shown in FIG. 2 is reached. The cover 14 is then pressed inwards, so that the situation shown in FIG. 4 is reached. The cover 14 is then displaced laterally, i.e. parallel to a main plane thereof, towards a main plane of the first shell part 2, resulting in the situation shown in FIG. 5. In this situation, the edge of the cover 14 which is situated furthest from the locking member 26 is free of the opening 12, so as to be tilted out of the housing, as shown in FIG. 6. The cover 14 can then be removed from the housing 1 entirely, thus reaching the situation shown in FIG. 7.

It should be noted that even without the presence of the locking means 26, 35, a housing according to the invention is obtained which is protected against the cover 14 coming off in an undesired manner, in particular when the cover 14 is subjected to impact forces. This is because, in order to remove the cover 14 in the situation shown in FIG. 2, it is necessary first to press the cover a sufficient distance inwards, followed by a lateral displacement of the cover 14 over a sufficient distance. These four requirements (two for the displacement direction and two for the magnitude thereof) considerably limit the risk of the cover coming off in an undesired manner.

The cover may be of a different form from that shown in the figures, and the opposite edge section of the battery passage opening may be of correspondingly different shape. For example, the invention is also applicable if the cover does not have a section which moves into the battery passage opening during closure of this opening. In that case, that section of the cover which is situated further towards the inside of the compartment has to be retained between stops, in particular wall sections, of the shell parts 2, 3 so that it cannot be displaced laterally.

The spring means may be designed in various ways, for example as the compression spring 15 shown or as a leaf spring. Depending on the batteries positioned in the compartment and the locations of their contact faces, the spring means may, as is known per se, consist of conductive material and may be electrically connected with one another in order to provide a connection between contacts of adjacent batteries.

Furthermore, the overlapping edge sections 17, 18 of the opening 12 and the cover 14 do not have to be arranged over the entire periphery of the opening 12.

Furthermore, the cover according to the invention may be arranged in the longitudinal direction of the battery, opposite the battery.

Furthermore, the locking plate could be designed with only a single projection 29. The flexible holding member 35 which is situated furthest from the cover 14 can then be dispensed with and the function of the rib 36 thereof can be assumed by a rib arranged on the inside of the cover 14.

What is claimed is:

1. Housing for electronic means, comprising:

a compartment with an opening which is arranged in a wall of the housing and which is suitable for allowing through a battery and placing the battery in the compartment, a cover, which is suitable for closing of the opening, spring means which are arranged inside the compartment and which are such as to develop a spring force, with the cover in its position closing the compartment opening, against the cover and the battery inside the compartment, and bearing means, which are arranged in the region of the opening and which have inwardly facing bearing surfaces which are suitable for bearing a section of the cover, and the cover and the remainder of the housing have dimensions which allow translation of the cover for displacing it from its closing position to a position in which it leaves the compartment opening open, wherein the spring means are arranged to urge the cover outwardly, a room between the cover and the battery placed in the compartment being sufficient to allow displacement of the cover, in sequence and vice versa, from its closing position moving inwardly against the spring force, tilting and inward translation, further tilting and outward translation of the cover, inside the housing, and opposite the cover, and there are arranged blocking means which are operable from the outside to move a blocking part of the blocking means to or from the cover being in its closing position to not allow and to allow respectively the removal of the cover from the housing.

2. Housing according to claim 1, wherein further stop means are arranged inside the housing at a distance from the locking means, as seen parallel to a main plane of the cover, and opposite the cover, which stop means, in the unlocked and pressed-in position of the cover, allow the cover to adopt an inclined position with respect to a main plane of the opening such that, with the cover fully pushed inward, a distance between the cover and the opening is greater when nearer to the locking means.

3. Housing according to claim 2, wherein the further stop means comprise an edge of a wall of the compartment which extends toward the locking means with increasing distance to the main plane through the opening.

4. Housing according to claim 1, wherein the locking means comprise a projection which can be rotated about a pin which is substantially parallel to a main plane of the opening, and the pin has engagement means on the outside of the housing for actuating the pin, in such a manner that when the cover has closed off the opening a support surface of the projection can be rotated onto or free of the cover.

5. Housing according to claim 1, wherein the locking means comprise a projection which can be rotated about a pin which is substantially parallel to a main plane of the opening, and the pin has engagement means on the outside of the housing for actuating the pin, in such a manner that when the cover has closed off the opening a support surface of the projection can be rotated onto or free of the cover, and the locking means furthermore comprise an uneven part of the supporting surface of the projection and a first holding member which projects from a wall inside the housing and is radially flexible with respect to the pin, and the first holding member has an uneven part which is complementary to the uneven part of the supporting surface of the projection, the uneven parts engaging in one another when the cover has closed off the opening and the supporting surface of the projection is supported against the cover.

6. Housing according to claim 1, wherein the locking means comprise a projection which can be rotated about a pin which is substantially parallel to a main plane of the opening, and the pin has engagement means on the outside of the housing for actuating the pin, in such a manner that when the cover has closed off the opening a support surface of the projection can be rotated onto or free of the cover and the locking means furthermore comprise a second holding member which projects from a wall inside the housing and is radially flexible with respect to the pin, and the second holding member has an uneven part which is complementary to the uneven part of the supporting surface of the projection, the uneven parts engaging in one another when the projection is sufficiently free of the cover for it to be possible to displace the cover laterally.

7. Housing according to claim 1, wherein the locking means comprise a projection which can be rotated about a pin which is substantially parallel to a main plane of the opening, and the pin has engagement means on the outside of the housing for actuating the pin, in such a manner that when the cover has closed off the opening a support surface of the projection can be rotated onto or free of the cover, and the pin has two identical projections which are arranged radially opposite one another on either side of the pin.

8. An electronic housing unit, comprising:

a compartment with an opening in a wall of the housing which accepts a battery within the compartment and has inwardly bearing faces suitable for bearing against a section of the cover;

a cover configured to close off the opening by bearing against the inwardly facing bearing surfaces; and spring means arranged inside the compartment at the opening that provides force against the cover and battery sufficient to close the compartment with the cover and to allow the cover to be opened by tilting and translating the inward the cover;

wherein the cover and the housing unit are dimensioned such that the cover may be moved between an opening and closing position by tilting and inward translation.

* * * * *